United States Patent [19]

Suzuki et al.

[11] 4,455,608

[45] Jun. 19, 1984

[54] INFORMATION TRANSFERRING APPARATUS

[75] Inventors: Seigo Suzuki, Yokohama; Seiji Eguchi, Kawasaki; Yoshiaki Moriya, Tokyo, all of Japan

[73] Assignee: Tokyo Shibaura Denki Kabushiki Kaisha, Kawasaki, Japan

[21] Appl. No.: 328,525

[22] Filed: Dec. 8, 1981

Related U.S. Application Data

[63] Continuation-in-part of Ser. No. 125,571, Feb. 28, 1978, abandoned, which is a continuation of Ser. No. 960,181, Nov. 8, 1978, abandoned, which is a continuation of Ser. No. 732,727, Oct. 15, 1976, abandoned.

[30] Foreign Application Priority Data

Oct. 15, 1975 [JP] Japan .............................. 50-123239

[51] Int. Cl.³ ............................................. G06F 13/00
[52] U.S. Cl. .................................................... 364/200
[58] Field of Search ................................ 364/200, 900

[56] References Cited

U.S. PATENT DOCUMENTS

| | | | |
|---|---|---|---|
| 3,573,745 | 4/1971 | May | 364/900 |
| 3,686,641 | 4/1972 | Logan | 364/200 |
| 3,771,142 | 11/1973 | Minshull | 364/200 |
| 3,878,513 | 4/1975 | Werner | 364/200 |
| 3,952,289 | 4/1976 | Baligant | 364/200 |
| 4,027,288 | 5/1977 | Barton | 364/200 |
| 4,084,228 | 4/1978 | Dufond | 364/200 |
| 4,109,310 | 8/1978 | England | 364/200 |

*Primary Examiner*—Harvey E. Springborn
*Attorney, Agent, or Firm*—Finnegan, Henderson, Farabow, Garrett & Dunner

[57] ABSTRACT

An information transferring apparatus comprises a central processing unit, and an input/output unit, a first-in first-out stack having a plurality of memory elements connected in series and being disposed between the central processing unit and the input/output unit, a command register which is set to a predetermined state under program control by the central processing unit, and a control circuit which receives a signal produced from the command register when the command register is set to a predetermined state and applies a signal designating the memory element which is to be the first memory element of the first-in first-out stack from which information is to be transferred and permits the information stored in the first memory element to be read out directly to the input/output unit.

5 Claims, 4 Drawing Figures

F I G. 3A
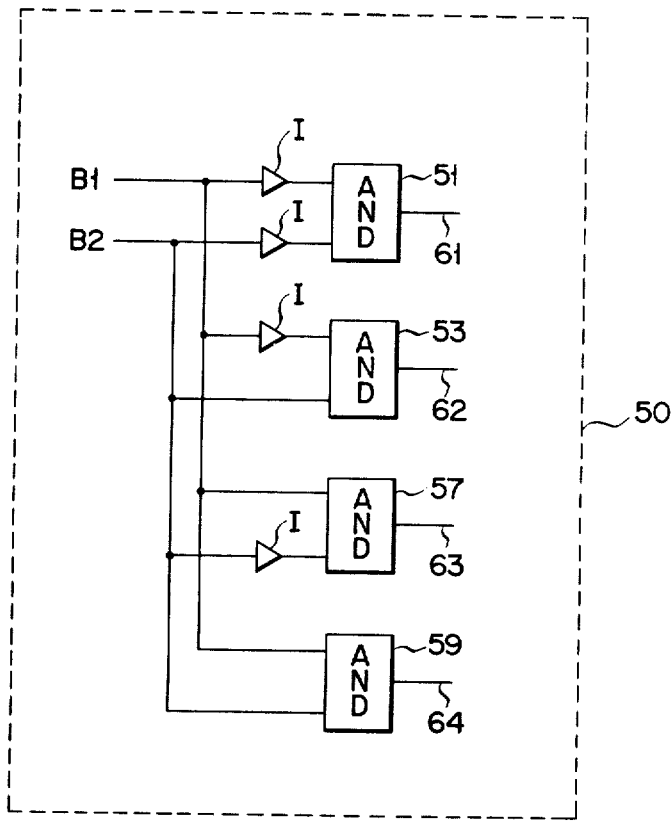

INFORMATION TRANSFERRING APPARATUS

CROSS-REFERENCE TO RELATED APPLICATION

This application is a continuation-in-part of U.S. patent application Ser. No. 125,571, filed Feb. 28, 1978, now abandoned, which was a continuation of U.S. patent application Ser. No. 960,181, filed Nov. 8, 1978, now abandoned, which was a continuation of U.S. patent application Ser. No. 732,727, filed Oct. 15, 1976, now abandoned.

BACKGROUND OF THE INVENTION

I. Field of the Invention

The present invention relates to an information transferring apparatus which has an improved data buffer disposed between an information processor unit and an input/output unit.

II. Description of the Prior Art

In the past it has been common for an information transferring apparatus, for example as shown in FIG. 1, to include a first-in first-out (FIFO) stack 30 to perform as a data buffer between an information transferring unit 10 and an input/output unit 20. The number of words included in the FIFO stack (the depth of information) is determined by the components constituting the buffer, e.g., the number of storage locations included in a physical memory and cannot be altered by a program. Such an arrangement is not problematic when the input/output unit is of the type in which the direction of information flow is unidirectional, such as from the information processing unit to a printer, paper tape punch, or a display. This is because in such devices once the information has been transferred to the first location of the FIFO stack it will be unavailable to the input/output unit until the information has been shifted through the series of data storage locations or memory elements constituting the FIFO stack. However, in the situation where status information or command information is stored in the FIFO stack, it is often the case that the information most recently entered into the FIFO stack 30 will be required to be processed by the information processing unit.

The FIFO stack 30 is formed of a plurality of memory elements connected in series wherein information words, e.g., data words, status data, and control information, stored in the first stage memory element of the FIFO are rippled through subsequent memory elements as it is shifted to the last stage memory element. From the last stage memory element the information is next shifted to some other system element such as an I/O controller or a peripheral device. Accordingly, in a case where the central processing unit 10 must check the information most recently stored in the FIFO stack 30, it is impossible to instantly read the newest information from the FIFO stack 30. That is, information requested by the central processing unit 10 must first be shifted to the last stage memory element of the FIFO stack 30, must then be transferred from the FIFO stack 30 to the input/output unit 20, and finally must be transferred to the central processing unit 10. This necessitates a highly complex circuit and is very time-consuming.

SUMMARY OF THE INVENTION

Accordingly, an object of the present invention is to provide an information processing apparatus having an FIFO stack used as a data buffer whose depth of information can be selectively varied.

According to the present invention, there is provided an information processing apparatus comprising first and second information processing units, a first-in first-out (FIFO) stack for data buffering disposed between the first and second information processing units, and apparatus which operates responsive to a program information signal delivered from the first information processing unit to produce a signal corresponding to the program information signal which in turn is applied to the FIFO stack to designate the depth of information of the FIFO.

Other features and objects of the present invention will be apparent from the following description when considered in connection with the accompanying drawings, in which:

BRIEF DESCRIPTION OF THE DRAWINGS

FIG. 3A is a logic block diagram of an embodiment of the control circuit of FIG. 2.

DETAILED DESCRIPTION OF THE PREFERRED EMBODIMENT

Figure 2:
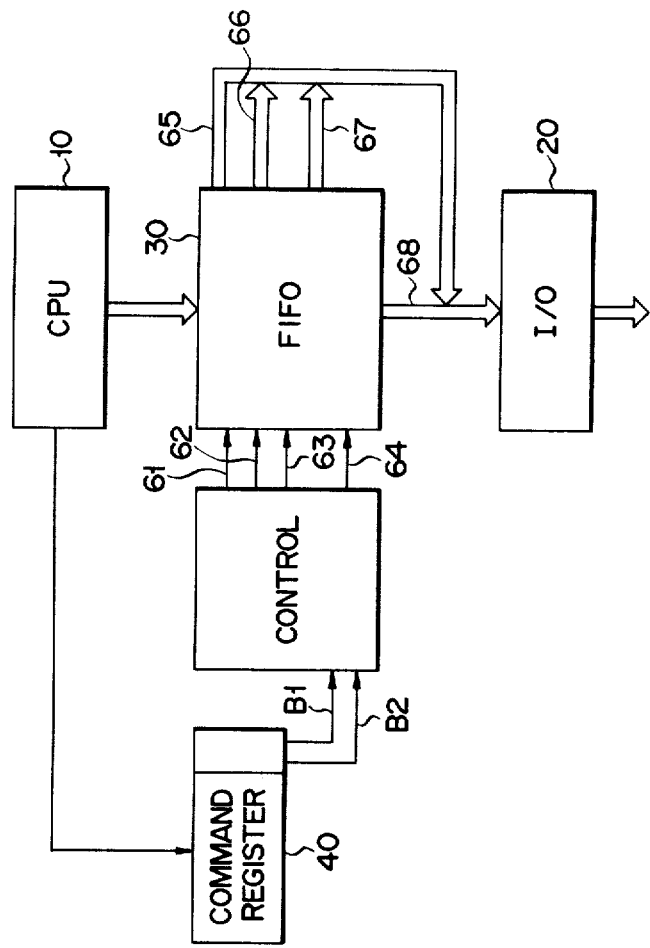
FIG. 2 is a block diagram of an embodiment of an information processing apparatus according to the present invention.
Figure 1:
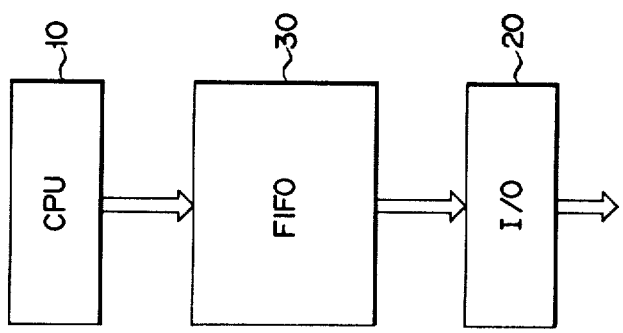
FIG. 1 is a block diagram of a conventional information processing apparatus for illustrating the flow of information.

Like the conventional information processor shown in FIG. 1, the information processing apparatus according to the present invention, as shown in FIG. 2, comprises a first information processing unit such as a central processing unit (CPU) 10, a second information processing unit such as an input/output (I/O) unit 20, and a first-in first-out (FIFO) stack 30 disposed between the CPU 10 and the I/O unit 20.

A command register 40 is set to a specific bit state in response to the program information fed from the CPU 10 and produces a binary signal of two bits in length (B1,B2) corresponding to the state of the command register 40. A control circuit 50 receives the two bit signal (B1,B2) from the command register 40 and supplies an output signal corresponding to the two bit signal to the FIFO stack 30 for control thereof.

If the command register 40 is set to a certain bit state by the program informatin from the CPU 10 and produces a two bit signal B1,B2=0,0, upon receipt of the two bit signal B1,B2=0,0, the control circuit 50 transfers its output signal to the memory element at a first stage of the FIFO stack 30 through a control line 61. The output signal from the control circuit 50 causes the FIFO stack 30 to be set to have a depth of information of one word so that the information most recently transferred from the CPU 10 to the FIFO stack 30 is permitted to be transferred from the first stage memory element of the FIFO stack 30 to the I/O unit 20 through an information line 65.

When the command register 40 produces a two bit signal B1,B2=0,1, the control circuit 50 produces a signal which in turn is applied to the memory element at a fourth stage of the FIFO stack 30 through a control line 62 so that the stack 30 is set to have a depth of information of four words. Accordingly, the information from the CPU 10 is shifted through the FIFO stack 30 up to the fourth stage memory element, and then is selectively transferred to the I/O unit 20 through the information line 66.

When the command register 40 produces a two bit signal B1,B2=1,0, the control circuit 50 delivers an output signal through a control line 63 associated with the output of the memory element at a sixteenth stage of the FIFO stack 30 so that the FIFO stack 30 is set to have a depth of information of sixteen words. Accordingly, the information stored in the sixteenth stage memory element of the FIFO stack 30 is transferred to the I/O unit 20 through an information line 67.

Similarly, when the command register 40 is set to a certain bit state under a program control of the CPU 10 and produces a two bit signal B1,B2=1,1, the control circuit 50 delivers its output signal through a control line 64 associated with the output of the memory element at a sixty-fourth position of the FIFO stack 30 so that a depth of information of the FIFO stack 30 is set to be 64 words. Accordingly, the information from the CPU 10 is shifted through the FIFO stack 30 up to the sixty-fourth memory element and then is selectively transferred to the I/O unit 20 through an information line 68.

FIG. 3A illustrates an embodiment of the control circuit 50. The control circuit 50 includes AND gates 51, 53, 57 and 59 having their inputs connected to the first and second bit lines, B1,B2, outputted by the command register 40. The signals B1 and B2 are inverted by responsive inverters I on input to the AND gate 51. The signal B1 is inverted on input to the AND gate 57 and the signal B2 is inverted on input to the AND gate 53.

If B1,B2=0,0 the output of the AND gate 51 on the signal line 61 will be equal to 1 and the outputs of the AND gates 53, 57 and 59 will be equal to 0. When the signals B1,B2=0,1 the output of the AND gate 53 on the signal line 62 will be equal to 1 and the outputs of the AND gates 51, 57 and 59 will be equal to 0. Similarly, signal values B1,B2=1,0 cause the output of the AND gate 57 on the signal line 63 to be equal to 1 and the outputs of the AND gates 51, 53 and 59 would be equal to 0. Finally, an input signal value B1,B2=1,1 results in the AND gate 59 outputting a 1 on the signal line 64 and the AND gates 51, 53 and 57 outputting 0's.

Figure 3B:
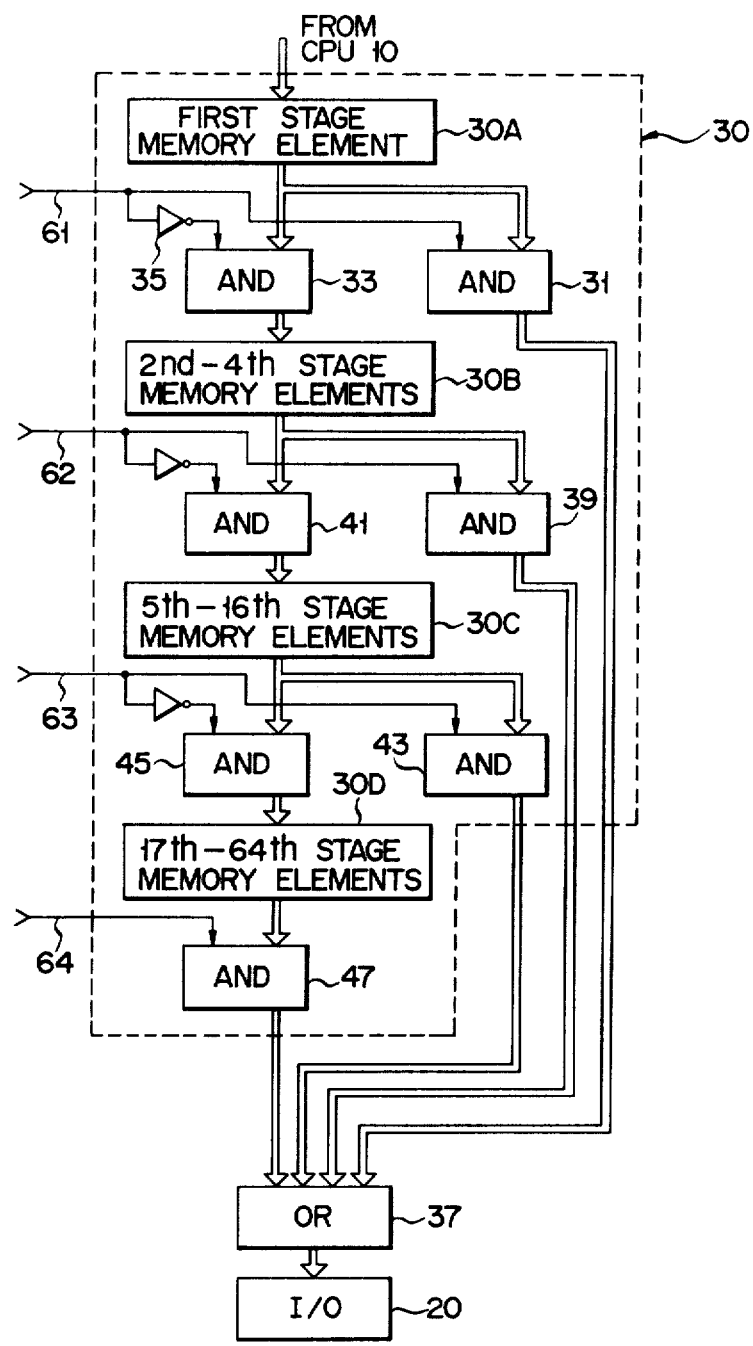
FIG. 3B is a logic block diagram of an embodiment of the FIFO of FIG. 2.

FIG. 3B is a logic block diagram of the FIFO stack 30 of FIG. 2. As shown in FIG. 3B, the FIFO stack 30 is divided into a first stage memory element 30A second—fourth stage memory elements 30B, fifth—sixteenth stage memory elements 30C and seventeenth—sixty-fourth stage elements 30D. A first bypass logic circuit is provided, as will be described, to selectively transfer the output of the first stage memory element 30A to the input of the second—fourth stage memory elements 30B or to the I/O unit 20 under the control of the signal line 61.

A second bypass logic circuit is provided to selectively transfer the output of the second—fourth stage memory element 30B to the input of the fifth—sixteenth stage memory elements 30C or to the I/O unit 20 under the control of the signal line 62. A third bypass logic circuit is provided to selectively transfer the output of the fifth—sixteenth stage memory elements 30C to the input of the seventeenth—sixty-fourth stage memory elements 30D or to the I/O unit 20 under the control of the signal line 63. Further, the output from the seventeenth—sixty-fourth stage memory elements 30D is transferred to the I/O unit 20 under the control of the signal line 64.

The input to the first stage memory element 30A is the output of the CPU 10. The output of the first stage memory element 30A is supplied in parallel to first input terminals of each of a first AND gate 31 and a second AND gate 33. A second input terminal of the first AND gate 31 receives the output of the AND gate 51 directly over the signal line 61. A second input terminal of the second AND gate 33 receives the output of the AND gate 51 through an inverter 35 connected between the second input terminal of the AND gate 33 and the signal line 61. Thus, when the signal line 61 has a value of 1, the output of the first stage memory element 30A will be transmitted through the first AND gate 31 to a first input terminal of an OR gate 37. No output will be permitted from the second AND gate 33 in such a situation because the second input terminal of the second AND gate 33 will have a zero value as a result of the inverter 35.

If the signal on the signal line 61 has a 0 value, then a transfer from the first stage memory element 30A to the OR gate 37 through the first AND gate 31 will be inhibited. The output of the first stage memory element 30A will, however, be transferred by the second AND gate 33 to the second—fourth stage memory elements 30B.

In the same manner, the output of the second—fourth stage memory elements 30B is transferred to the I/O unit 20 through an AND gate 39 and OR gate 37 when the signal on the signal line 62 has a value of 1 and to the fifth—sixteenth memory elements 30C through an AND gate 41 when the signal on the signal line 62 has a 0 value. Further, the output of the fifth—sixteenth stage memory elements 30C is transferred to the I/O unit 20 through an AND gate 43 and OR gate 37 when the signal on the signal line 63 has a value of 1 and to the seventeenth—sixth-fourth stage memory elements 30D through an AND gate 45 when the signal on the signal line 63 has a 0 value. The output of the seventeenth—sixty-fourth stage memory elements 30D is transferred to the I/O unit 20 through an AND gate 47 and OR gate 37 when the signal on the signal line 64 has a value of 1.

As stated above, the depth of information of the FIFO stack 30 can selectively be set to 1, 4, 16 and 64 words or memory elements.

As described above, the present invention has provided an information processing apparatus in which the information may be efficiently and rapidly processed by selectively changing the depth of information of the FIFO stack 30 through the programmed control of the CPU 10.

In the embodiment heretofore described, four different signal values of the two bit signal (B1,B2) are produced from the command register 40, and upon receipt of such two bit signals the control circuit 50 selects the depth of information of the FIFO stack 30. Further, if signals of three or more bits are used for the output signal of the command register 40, the depth of information of the FIFO stack 30 may be selected at depths different from the above-described embodiment.

It will be apparent to those skilled in the art that additional modifications and variations can be made in the embodiment described herein without departing from the scope or the spirit of the invention and it is intended that those modifications and variations which come within the scope of the appended claims and their equivalents are included in the present invention.

What we claim is:

1. An information transferring apparatus comprising:

first and second information processing units, said first information processing unit for generating a program information signal and a series of information words to be transferred from said first information processing unit to said second information processing unit;

a first-in first-out fixed length stack comprising a series of storage locations including a first storage location, a plurality of intermediate storage locations and a last storage location for buffering and normally transferring said information words from said first information processing unit to said second information processing unit by the shifting of the information words serially through said plurality of storage locations from said first storage location to said last storage location;

means for producing a depth control signal having a first value or a second value in response to said program information signal and for applying said first value of said values of said depth control signal to said first-in first-out stack to designate one of said series of storage locations of said first-in first-out stack for transferring a said information word to said second information processing unit; and means responsive to said second value of said depth control signal for controlling the transfer of the information word stored in said designated storage location of said first-in first-out stack to said second information processing unit.

2. An information transferring apparatus according to claim 1, wherein said first information processing unit is a central processing unit and said second information processing unit is an input/output unit.

3. An information transferring apparatus according to claim 2, wherein said first-in first-out stack further includes a first AND gate and a second AND gate, each of said AND gates including first and second input terminals and an output terminal, said first input terminals of said first and second AND gates being connected to the output of one of said storage locations, said second input terminal of said first AND gate for receiving said first value of said depth control signal, and said second input terminal of said second AND gate for receiving the second value of said depth control signal, the output of said first AND gate being connected to the designated location of said first-in first-out stack and the output of said second AND gate being connected to the input of the next storage location following said designated one storage location in said series of storage locations, said first AND gate controlling the transfer of said data word stored in said designated one storage location responsive to said first value of said depth control signal and said second AND gate controlling the transfer of said data word stored in said one storage location next following the designated storage location in response to said second value of said depth control signal.

4. An information transferring apparatus according to claim 1, wherein said means responsive to the program information signal comprises a command register which is set to a selected bit state in accordance with said program information signal to produce said first and second values of depth control signal corresponding to said bit state.

5. An information transferring apparatus comprising:

a first information processing unit for generating information words and a storage information signal;

a second information processing unit;

memory means for transferring said information words from said first information processing unit to said second information processing unit, said memory means comprising a predetermined number of storage locations connected in series for storing said information words, and including a first storage location connected to said first information processing unit for serially receiving said information words, a last storage location for serially transferring said information words to said second information processing unit, and a plurality of intermediate storage locations for normally serially shifting said information words from said first storage location to said last storage location, and bypass circuit means for connecting the output of a designated one of the outputs of the first storage location or said plurality of intermediate storage locations serially following said designated one storage location to said second information processing unit;

a command circuit for generating a two state depth control signal in response to said storage information signal; and a control circuit coupled to said command circuit and said bypass circuit means for selectively controlling the transfer of said information word stored in said designated one storage location to said second information processing unit through said bypass circuit or for selectively controlling the transfer of said words of the storage locations serially following said one storage location in dependence upon which state said depth control signal is active.

* * * * *